(12) United States Patent
Talapov

(10) Patent No.: US 11,995,879 B2
(45) Date of Patent: May 28, 2024

(54) IMAGE PROCESSING FOR SEPARATION OF ADJACENT OBJECTS

(71) Applicant: DATALOGIC USA, INC., Eugene, OR (US)

(72) Inventor: Andrei Talapov, Lansdale, PA (US)

(73) Assignee: DATALOGIC USA, INC., Eugene, OR (US)

( * ) Notice: Subject to any disclaimer, the term of this patent is extended or adjusted under 35 U.S.C. 154(b) by 482 days.

(21) Appl. No.: 17/388,751

(22) Filed: Jul. 29, 2021

(65) Prior Publication Data

US 2023/0036967 A1  Feb. 2, 2023

(51) Int. Cl.
*G06V 10/26* (2022.01)
*G06T 11/60* (2006.01)
*G06V 20/00* (2022.01)
*G06V 20/64* (2022.01)

(52) U.S. Cl.
CPC .......... *G06V 10/273* (2022.01); *G06T 11/60* (2013.01); *G06V 20/00* (2022.01); *G06V 20/64* (2022.01)

(58) Field of Classification Search
None
See application file for complete search history.

(56) References Cited

U.S. PATENT DOCUMENTS

| | | | |
|---|---|---|---|
| 6,847,859 B2 | 1/2005 | Nuebling et al. | |
| 7,214,954 B2 | 5/2007 | Schopp | |
| 8,331,678 B2 | 12/2012 | Chapman et al. | |
| 9,396,554 B2 | 7/2016 | Williams et al. | |
| 10,451,405 B2 | 10/2019 | Clayton et al. | |
| 2010/0215249 A1* | 8/2010 | Heitz | G06T 7/593 382/154 |
| 2020/0103218 A1 | 4/2020 | Lamboley et al. | |
| 2021/0209784 A1* | 7/2021 | McCloskey | G06T 7/62 |
| 2022/0072800 A1* | 3/2022 | Diego Gutierrez | B33Y 10/00 |

OTHER PUBLICATIONS

Wikipedia, The Free Encyclopedia, "Convex hull", https://en.wikipedia.org/wiki/Convex_hull, Jul. 6, 2021, 17 pages.
Wikipedia, The Free Encyclopedia, "Minimum Bonding Box", https://en.wikipedia.org/wiki/Minimum_bounding_box, Feb. 16, 2021, 2 pages.

* cited by examiner

*Primary Examiner* — Leon Viet Q Nguyen
(74) *Attorney, Agent, or Firm* — Cozen O'Connor

(57) ABSTRACT

Image processing to discriminate imaged objects that are adjacent or overlapping. Non-empty cells of the image that contain portions of the objects, and empty cells that lack any portions of the objects, are all determined. A global convex hull is defined to surround the non-empty cells of the image. Voids, including at least a first void and a second void, are found within the global convex hull, each being composed of contiguous empty cells and having a corresponding void boundary. A separation line is defined based on a first separation line endpoint along the void boundary of the first void and a second separation line endpoint along the void boundary of the second void, to separate two of the objects in the image. An output may be produced that includes indicia of at least portions of distinct boundaries of the objects in the image based on the separation line.

20 Claims, 15 Drawing Sheets

IMAGE PROCESSING FOR SEPARATION OF ADJACENT OBJECTS

TECHNICAL FIELD

The present disclosure generally relates to machine vision and, more particularly, to object detection and discrimination in images.

BACKGROUND

Uses for machine-vision are rapidly expanding thanks to advancements in imaging, computing, and image-processing technologies. For example, in some material-handling and other applications there is a need for detecting and dimensioning objects that are in motion relative to the image-capture device. Objects may be stationary relative to the image capture device, or moving (e.g., on a conveyor belt or vehicle). The objects may be stationary while the image-capture device is in motion, or the objects and, separately, the image capture device, may be in motion. In such scenarios, there is a need for a computationally-efficient technique that can detect and discriminate objects in captured images quickly and accurately so that the system can be available to capture and assess the next set of objects entering the field of view of the image-capture device.

In material-handling and various other applications, object detection can become quite challenging when there are multiple objects in the field of view of the image-capture device, and even more so when the objects of interest have varying sizes and shapes that are not known a priori. Furthermore, when such objects are adjacent or overlapping, the difficulty of telling objects apart from one another compounds considerably.

Solutions are needed to address these, and related, challenges in image processing of multiple objects.

SUMMARY

According to some aspects of this disclosure, an image processing system for discriminating imaged objects that are adjacent or overlapping is provided. The system includes an input to receive a captured image representing the objects, and an object separation engine operatively coupled to the input to perform autonomous processing of the captured image. The autonomous processing includes: determination of non-empty cells of the image that contain portions of the objects, and empty cells of the image that lack any portions of the objects; determination of a global convex hull surrounding the non-empty cells of the image; determination of voids, including at least a first void and a second void, within the global convex hull, each of the voids being composed of contiguous empty cells of the image and having a corresponding void boundary; determination of a separation line based on a first separation line endpoint along the void boundary of the first void and a second separation line endpoint along the void boundary of the second void, wherein the separation line separates two of the objects in the image. The autonomous processing produces an output that includes, indicia of at least portions of distinct boundaries of the objects in the image based on the separation line.

The system may be incorporated as part of a material-handling system, such as a mass-flow system, in some implementations. In other implementations, the system can be employed in various machine-vision scenarios, such as in object recognition, symbol reading, object detection, and myriad others.

In a related aspect, an automated method for processing an image to discriminate imaged objects that are adjacent or overlapping includes receiving a captured image representing the objects; determining non-empty cells of the image that contain portions of the objects, and empty cells of the image that lack any portions of the objects; determining a global convex hull surrounding the non-empty cells of the image; determining voids, including at least a first void and a second void, within the global convex hull, each of the voids being composed of contiguous empty cells of the image and having a corresponding void boundary; defining a separation line based on a first separation line endpoint along the void boundary of the first void and a second separation line endpoint along the void boundary of the second void, wherein the separation line separates two of the objects in the image; and producing an output that includes indicia of at least portions of distinct boundaries of the objects in the image based on the separation line.

Another aspect is directed to at least one non-transitory machine-readable storage medium containing instructions that, when executed by computing hardware, cause the computing hardware to implement automated operations for processing an image to discriminate imaged objects that are adjacent or overlapping in accordance with the method summarized above.

DETAILED DESCRIPTION

Figure 1A:
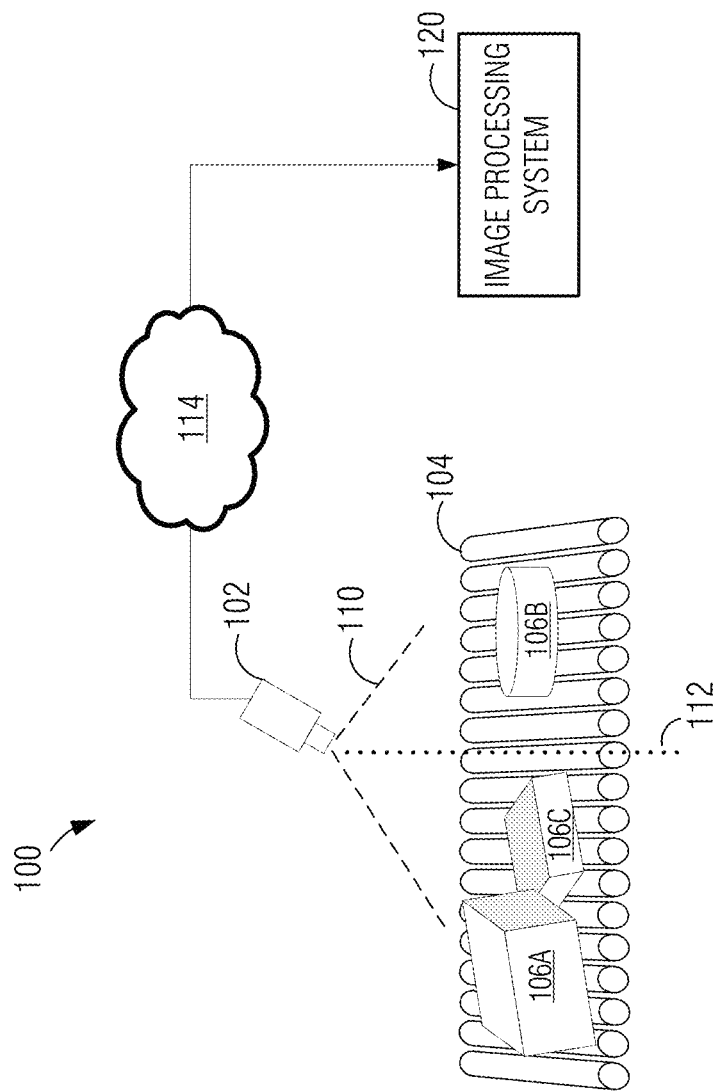
FIG. 1A is a simplified schematic diagram illustrating a basic application of a system according to some embodiments.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

Aspects of the present disclosure are directed to automated image processing to detect multiple distinct objects in the image and determine the boundaries of those objects so that those objects may be further assessed separately. Further assessment of such objects may include such operations as counting the number objects in the image, respectively dimensioning (i.e., assessing the size of) each of the objects, recognizing or identifying each of the objects, or the like. Advantageously, the image processing according to these aspects is operative to discriminate objects which may be touching or overlapping.

FIG. 1A is a simplified schematic diagram illustrating a basic application of system 100 according to some embodiments. As discussed further below, system 100 may be employed to determine the presence of distinct disparate objects, and to perform further assessment or of those objects.

In some embodiments, the system 100 may include an image capture device 102, such as a camera (having an image sensor and suitable optics) or scanner (e.g., laser profiler, a laser dimensioner or scanning laser displacement sensor, from which image data may be derived as the projections of the point cloud captured by the scanner, on a plane, such as the plane of a conveyor belt conveying the objects). Appropriate interfaces (e.g., wired, wireless) may be connected to and/or installed in the image capture device 102 so that the image capture device captures an image of a target objects 106A-106C (collectively, target objects 106). In the illustrated example, conveyor 104 carries target objects 106. Target objects 106 may pass within a field of view (FOV) 110 (or scanning plane 112) of image capture device 102, which produces a 2D image of the target objects 106.

In some embodiments, image capture device 102 may be operatively coupled to an image processing system 120 through a network 114 (e.g., LAN, WAN, PAN, Internet). The image processing system 120 receives digital images from the image capture device 102. In some embodiments, the image capture device 102 may be connected directly to the image processing system 120 through a suitable local interface (e.g., USB) or may be integrated with the image processor system and interconnected using an internal interconnect such as a suitable variant of a peripheral component interconnect (PCI), serial AT Attachment (SATA), mobile industry processor interface (MIPI), or other interconnects known by those skilled in the art.

As discussed above, target objects 106 may have different sizes and shapes. For instance, target object 106A is depicted as a rectangular prism shape, whereas target object 106B is depicted as having a cylindrical shape. Moreover, target objects 106 may be touching or overlapping. In the example depicted in FIG. 1A, target object 106A and target object 106B are touching and overlapping. From the perspective of image capture device 102, objects 106A and 106B would appear to have one contiguous outline.

Figure 1B:
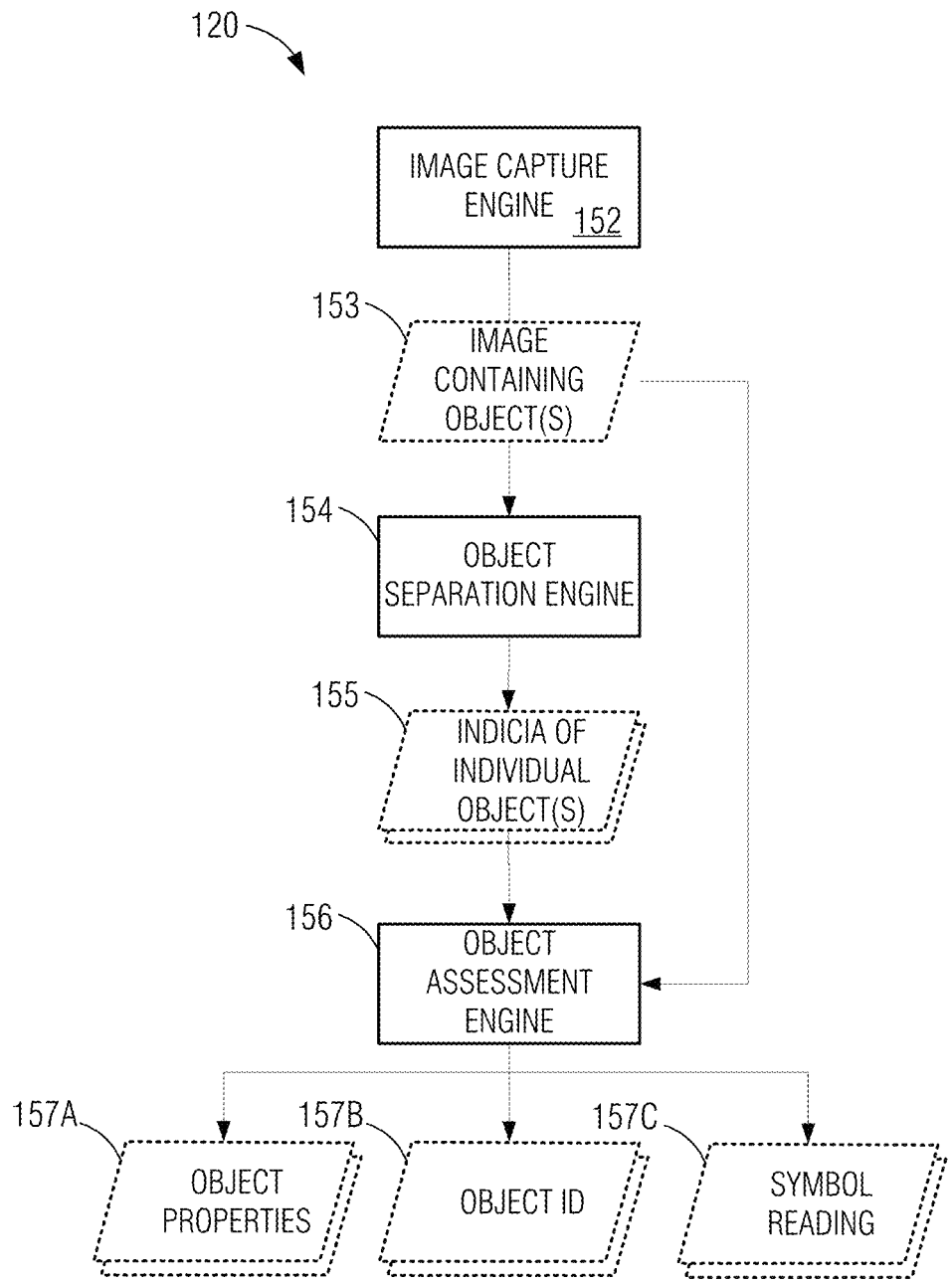
FIG. 1B is a high-level block diagram illustrating an example system architecture of an image processing system of the system of FIG. 1A.

FIG. 1B is a high-level block diagram illustrating an example system architecture of image processing system 120. Image processing system 120 includes various engines, each of which is configured to carry out a function or set of functions, as detailed below. The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As depicted in FIG. 1B, image processing system 120 includes image capture engine 152, which provides an interface with one or more image capture device 102. Image capture engine 152 receives as its input image files, scan data, or video frames, and converts the format of the input to a suitable 2D image and data structure type for subsequent processing. For instance, a captured image may be received over network 114 while in a compressed format (e.g., .png, .tiff, .jpg), as a laser-scan file format (e.g., .las, .laz, .pts, .ptx, .fls) or as a video stream (e.g., .mov, .m2s, .mpg, .wmv), and converted to a single image file (in the case where the captured image is part of a motion video) in a bitmap or other format suitable for processing. The received image may also be formatted from color to grayscale or monochrome, and stored in an image database, file system, or other suitable data storage arrangement. Image capture engine 152 produces, as its output, 2D image 153, which contains target objects 106. In a related embodiment, the image may be a 3D image, such as a 3D point cloud or other 3D representation, which includes depth information.

Object separation engine 154 receives as its input image 153, and includes data-processing facilities to determine if there is more than one object in image 153, and to discriminate objects which may be adjacent or overlapping so that the objects can be individually assessed by subsequent processing. Object separation engine 154 produces, as its output, indicia 155 of the individual objects within image 153, such as their locations, boundaries, or separators between those objects. In some implementations, indicia 155 may be object-specific, meaning that it includes one or more data structures corresponding to respective object(s) in image 153. In other implementations, indicia 155 may be image-specific, meaning that it is organized as a single data structure representing a plurality of objects appearing in image 153.

Object assessment engine 156 utilizes image 153 and indicia 155 to produce one or more assessments of the object(s) in image 153. For instance, object properties 157A may be determined, such as the dimensions or of each object. As another example, the object(s) may be identified to produce object ID 157B for each object. Further, any machine-readable symbol(s) on printed on, or affixed to, the object(s) (e.g., barcode, QR or other 2D symbol) may be read to produce symbol reading 157C. Similarly, human-readable indicia, such as printed labels with alphanumeric text or other symbols may be autonomously read by object assessment engine 156. Other types of symbol reading may include automated reading, recognition, or interpretation of graphical symbols, such as product packaging graphics, may be performed by object assessment engine 156 to produce symbol reading 157C. Notably, the operation of object assessment engine 156 is based on the discrimination of objects as performed by object separation engine 154.

Image processor system 120 may take the form of one or more server computer systems with associated nontransitory processor-readable storage media. While illustrated as a single computer system, many implementations may employ two or more computer systems or nontransitory associated processor- or computer-readable storage media. In some implementations or instances, the nontransitory processor- or computer-readable media may include a database or other data structure which stores one or more of: image data, model data, training data, test data, parameter data, image-processing algorithms, or other information.

While generally described below in terms of a user interface generated via instructions executing on a computing device, in some implementations the image processor system 120 may serve as a user portal that may operate, for example, as a Web server, serving HTML pages or providing Web services which function as the user interface. Thus, in some implementations, the image processor system 120 serves as a user portal, providing a user interface, for instance a Web based interface, which allows users access functionality disclosed herein via various other processor-based computing devices.

While often illustrated as a single nontransitory processor-readable storage medium, in many implementations each of the various illustrated nontransitory computer- or processor-readable storage media may constitute a plurality of nontransitory storage media. The plurality of nontransitory storage media may be commonly located at a common location, or distributed at a variety of remote locations. Database(s) may be stored separately from one another on separate computer- or processor-readable storage medium or may be stored on the same computer- or processor-readable storage medium as one another. Various computer- or processor-readable storage medium may be co-located with the corresponding computer systems, for example, in the same room, building or facility. Alternatively, various computer- or processor-readable storage medium may be located remotely from the corresponding computer systems (e.g., server computer systems) for example, in a different facility, city, state or country. Electronic or digital information, files or records or other collections of information may be stored at specific locations in non-transitory computer- or processor-readable media, thus are logically addressable portions of such media, which may or may not be contiguous.

Figure 2:
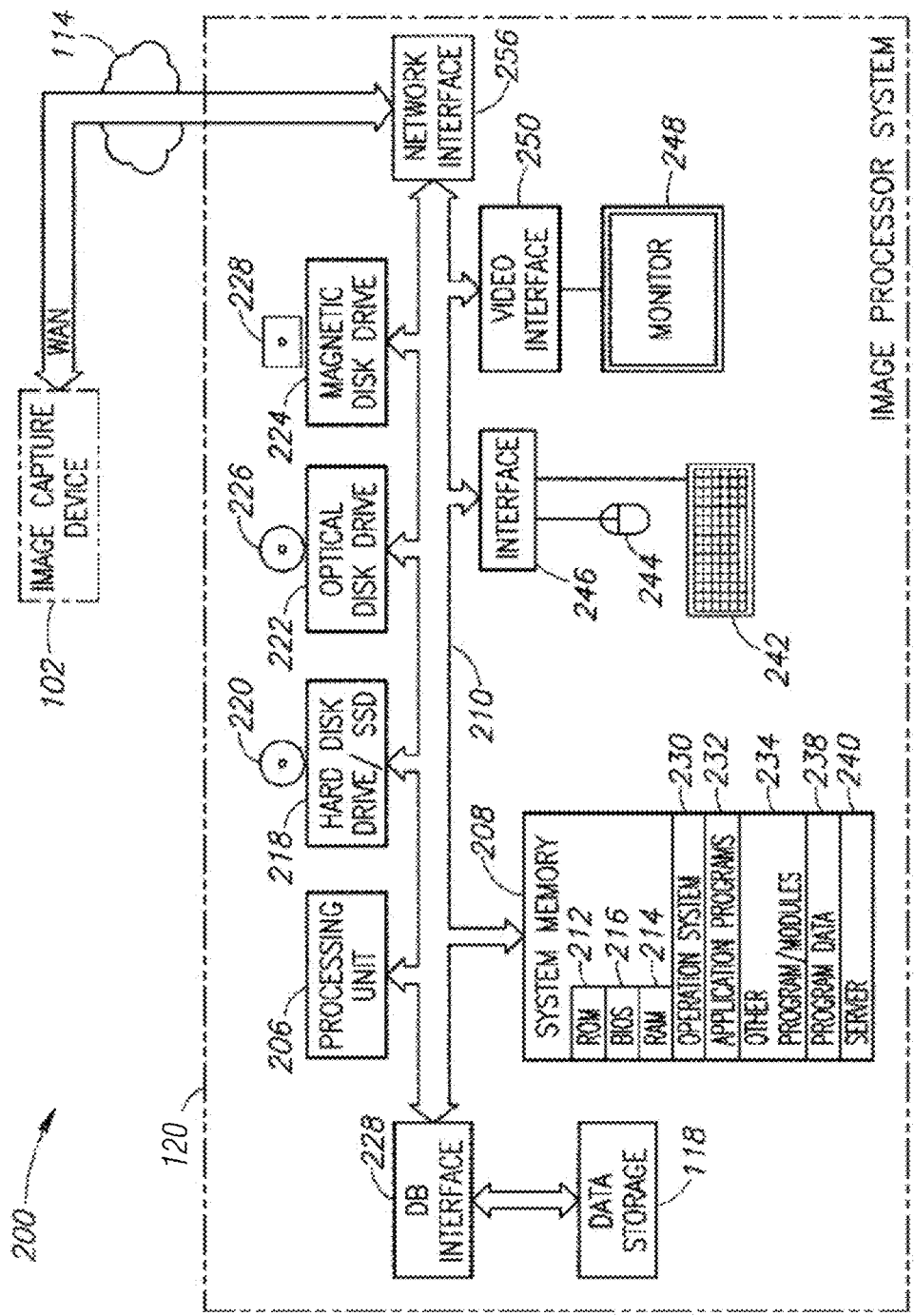
FIG. 2 is a diagram illustrating an example of hardware components with which the system of FIG. 1A, including the image processor system of FIG. 1B, can be implemented according to some embodiments.

FIG. 2 and the following discussion provide a brief, general description of an example of hardware components with which system 100, including image processor system 120, can be implemented. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system or processor-based device configurations, including hand-held devices for instance smart phones, multiprocessor systems, microprocessor-based or programmable consumer electronics, personal computers ("PCs"), network PCs, servers, mainframe computers, and the like. The embodiments can be practiced in distributed computing environments where tasks or modules are performed by remote processing devices, which are linked through a communications network. In a distributed computing environment, program modules may be located in both local and remote memory storage devices.

Image processor system 120 may take the form of conventional computing hardware (e.g., PC, server, or other computing system) 200 executing logic or other machine executable instructions that transform the conventional computing hardware into special-purpose image processor system 120. As depicted, computing hardware 200 includes one or more processors 206, a system memory 208 and a system bus 210 that couples various system components including the system memory 208 to the processor 206. The image processor system 120 will at times be referred to in the singular herein, but this is not intended to limit the embodiments to a single system, since in certain embodiments, there will be more than one image processor system 120 or other networked computing device involved.

The processor 206 may be any logic processing unit, such as one or more central processing units (CPUs), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The system memory 208 includes read-only memory ("ROM") 212 and random access memory ("RAM") 214. A basic input/output system ("BIOS") 216, which may be incorporated into at least a portion of the ROM 212, contains basic routines that help transfer information between elements within the image processor system 120, such as during start-up. Some embodiments may employ separate buses for data, instructions and power.

The computing hardware 200 also may include a hard disk drive 218 for reading from and writing to a hard disk 220, and an optical disk drive 222 and a magnetic disk drive 224 for reading from and writing to removable optical disks 226 and magnetic disks 228, respectively. The optical disk 226 can be a CD or a DVD, while the magnetic disk 228 can be a magnetic floppy disk or diskette. The hard disk drive 218, optical disk drive 222 and magnetic disk drive 224 communicate with the processor 206 via the system bus 210. The hard disk drive 218, optical disk drive 222 and magnetic disk drive 224 may include interfaces or controllers (not shown) coupled between such drives and the system bus 210, as is known by those skilled in the relevant art. The drives 218, 222, 224, and their associated computer-readable media 220, 226, 228, respectively, provide nonvolatile storage of computer-readable instructions, data structures, program modules and other data for the image processor system 120. Those skilled in the relevant art will appreciate that other types of computer-readable media may be employed to store data accessible by a computer, such as magnetic cassettes, flash memory cards, Bernoulli cartridges, RAMs, ROMs, smart cards, etc.

Program modules can be stored in the system memory 208, such as an operating system 230, one or more application programs 232, other programs or modules 234, and program data 238. For example, applications programs 232 may receive digital images captured from the image capture device 102 or stored in a data store. The system memory 208 may include communications programs 240 that permit the image processor system 120 to access and exchange data with other networked systems or components, such as the image capture device 102 and/or other computing devices.

While shown in FIG. 2 as being stored in the system memory 208, the operating system 230, application programs 232, other programs/modules 234, program data 238 and communications 240 can be stored on the hard disk 220 of the hard disk drive 218, the optical disk 226 of the optical disk drive 222 and/or the magnetic disk 228 of the magnetic disk drive 224.

Authorized personnel can enter commands (e.g., system maintenance, upgrades, etc.) and information (e.g., algorithm selections, algorithm parameters such as grid granularity settings, constants, equations, models, etc.) into the image processor system 120 using one or more communicably coupled input devices such as a touch screen or keyboard 242, a pointing device such as a mouse 244, and/or a push button (not shown). Other input devices can include a microphone, joystick, game pad, tablet, scanner, biometric scanning device, etc. These and other input devices are connected to the processing unit 206 through an interface 246 such as a universal serial bus ("USB") interface that couples to the system bus 210, although other interfaces such as a parallel port, a game port or a wireless interface or a serial port may be used. A monitor 248 or other display device is coupled to the system bus 210 via a video interface 250, such as a video adapter. In at least some instances, the input devices may be located proximate the image processor system 120, for example when the system is installed at the system user's premises. In other instances, the input devices may be located remote from the image processor system 120, for example when the system is installed on the premises of a service provider.

In some implementations, the image processor system 120 uses one or more of the logical connections to optionally communicate with one or more remote computers, servers or other devices via one or more communications channels, for example, one or more networks 114. These logical connections may facilitate any known method of permitting computers to communicate, such as through one or more LANs and/or WANs. Such networking environments are well known in wired and wireless enterprise-wide computer networks, intranets, extranets, and the Internet.

In some implementations, a network port or interface 256, communicatively linked to the system bus 210, may be used for establishing and maintaining communications over the communications network 114. Further, a data store interface 252, which is communicatively linked to the system bus 210, may be used for establishing communications with the nontransitory processor-readable storage medium or data store 118, which may a part of the image processor system 120 or at least in operative communication therewith. For example, the data store 118 may include a repository for storing information regarding algorithms, parameters, models, image data, etc. In some embodiments, the database interface 252 may communicate with the data store 118 via the network 114.

In system 100, program modules, application programs, or data, or portions thereof, can be stored in one or more computing systems. Those skilled in the relevant art will recognize that the network connections shown in FIG. 2 are only some examples of ways of establishing communications between computers, and other connections may be used, including wirelessly. In some embodiments, program modules, application programs, or data, or portions thereof, can even be stored in other computer systems or other devices (not shown).

For convenience, the processor 206, system memory 208, network port 256 and interfaces 246, 252 are illustrated as communicatively coupled to each other via the system bus 210, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled to each other using suitable connections (e.g., northbridge, southbridge) or entirely omitted in favor of direct connections.

Figure 3:
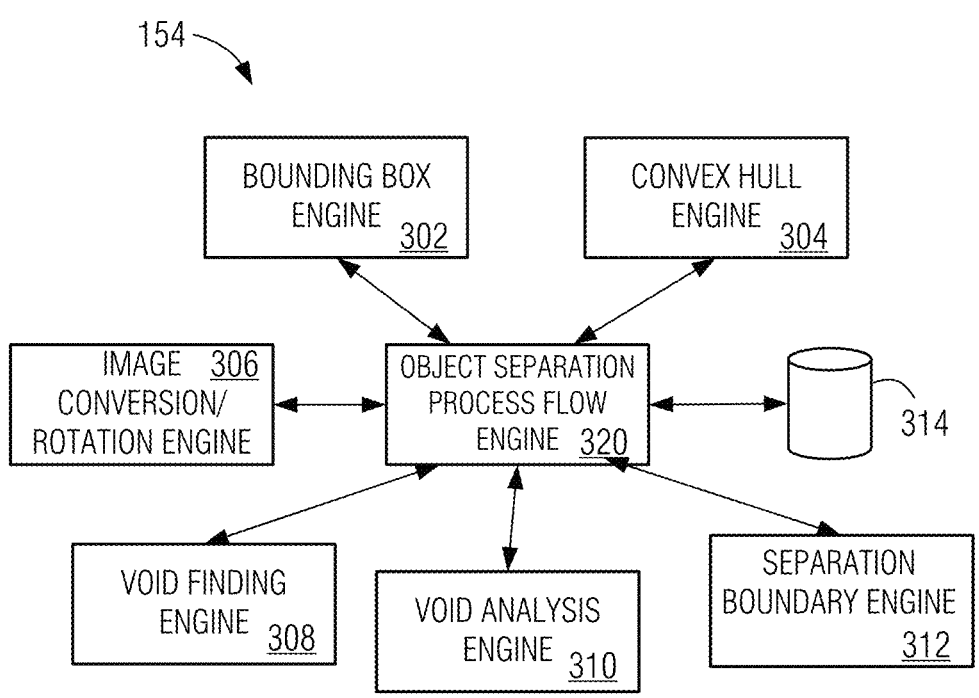
FIG. 3 is a system-architecture diagram illustrating an object separation engine according to an example implementation.

FIG. 3 is a system-architecture diagram illustrating object separation engine 154 in greater detail according to an example implementation. As illustrated, object separation engine 154 includes bounding box engine 302, convex hull 304, image conversion/rotation engine 306, void finding engine 308, void analysis engine 310, separation boundary engine 312, data store 314, and object separation process flow engine 320. Object separation process flow engine 320 coordinates the operations of, and data flow between, engines 302-312, and data store 314, to implement the functionality of object separation engine 154, which is described in greater detail below.

Bounding box engine 302 is constructed, programmed, or otherwise configured, to define bounding boxes around certain regions in image 153. Such regions may be target objects or clusters of touching or overlapping objects of non-empty regions, or they may be voids, depending on the image-processing operation calling for bounding box creation. Bounding box engine 302 may implement a suitable algorithm for creating a minimum-area enclosing rectangle as an expression of the maximum extents of a 2-dimensional object (e.g. point, line, polygon) or set of objects within their 2D (x, y) coordinate system.

Convex hull engine 304 is constructed, programmed, or otherwise configured, to define convex hulls around certain regions in image 153. Such regions may be non-empty regions, or they may be voids, depending on the image-processing operation calling for convex hull creation. Convex hull engine 304 may implement one or more suitable algorithms for creating convex hulls such as gift wrapping, Graham scan, Quickhull, divide and conquer, monotone chain, Kirkpatrick-Seidel, Chan's algorithm, or other.

Image conversion/rotation engine 306 is constructed, programmed, or otherwise configured, to preprocess image 153 to facilitate ease of computing. Image 153 may be cropped, scaled (e.g., downsampled), desaturated or color-depth-reduced, noise-filtered, or rotated to align an edge of an object with a coordinate axis, to facilitate processing. Other suitable image-preparation operations may also be handled by image conversion/rotation engine.

Void finding engine 308 is constructed, programmed, or otherwise configured, to detect regions in image 153 that lack the presence of any part of an object. Voids may be spaces between objects, or spaces surrounded by objects, such as the space inside a toroidal-shaped object. Void finding engine may use depth data, where available (e.g., in measurement arrangements where the image capture device utilizes a laser scanner or stereoscopic cameras), or suitable image-processing technique (e.g., color, luminosity, edge detection, surface pattern) to distinguish objects from the background in image 153. Void finder engine 308 may produce as its output boundary lines or convex hull representations circumscribing voids or portions of voids.

Void analysis engine 310 is constructed, programmed, or otherwise configured, to perform certain tests based on the features of the voids detected by void finding engine 308. For instance, void analysis engine may be used to identify relationships between portions of voids, or relationships between portions of voids and convex hull segments, such as nearest segments, most distant segments, most distant void, etc. Void analysis engine 310 may use a variety of suitable algorithms, or combinations thereof, to perform these various tests.

Separation boundary engine 312 is constructed, programmed, or otherwise configured, to determine a separating line between adjacent or overlapping shapes based on coordinated use of engines 302-310 and boundary line determination criteria as described in detail below.

Data store 314 maintains adjustable parameters or constants for use with algorithms executed by engines 302-312. Such parameters or constants may be user-configurable in some implementations. In related implementations, such parameters may be adaptively adjusted by the algorithms themselves, such as being adjusted by optimizing algorithms, training algorithms, or the like. In the latter example, training data or models may be maintained in data store 314.

Figure 4:
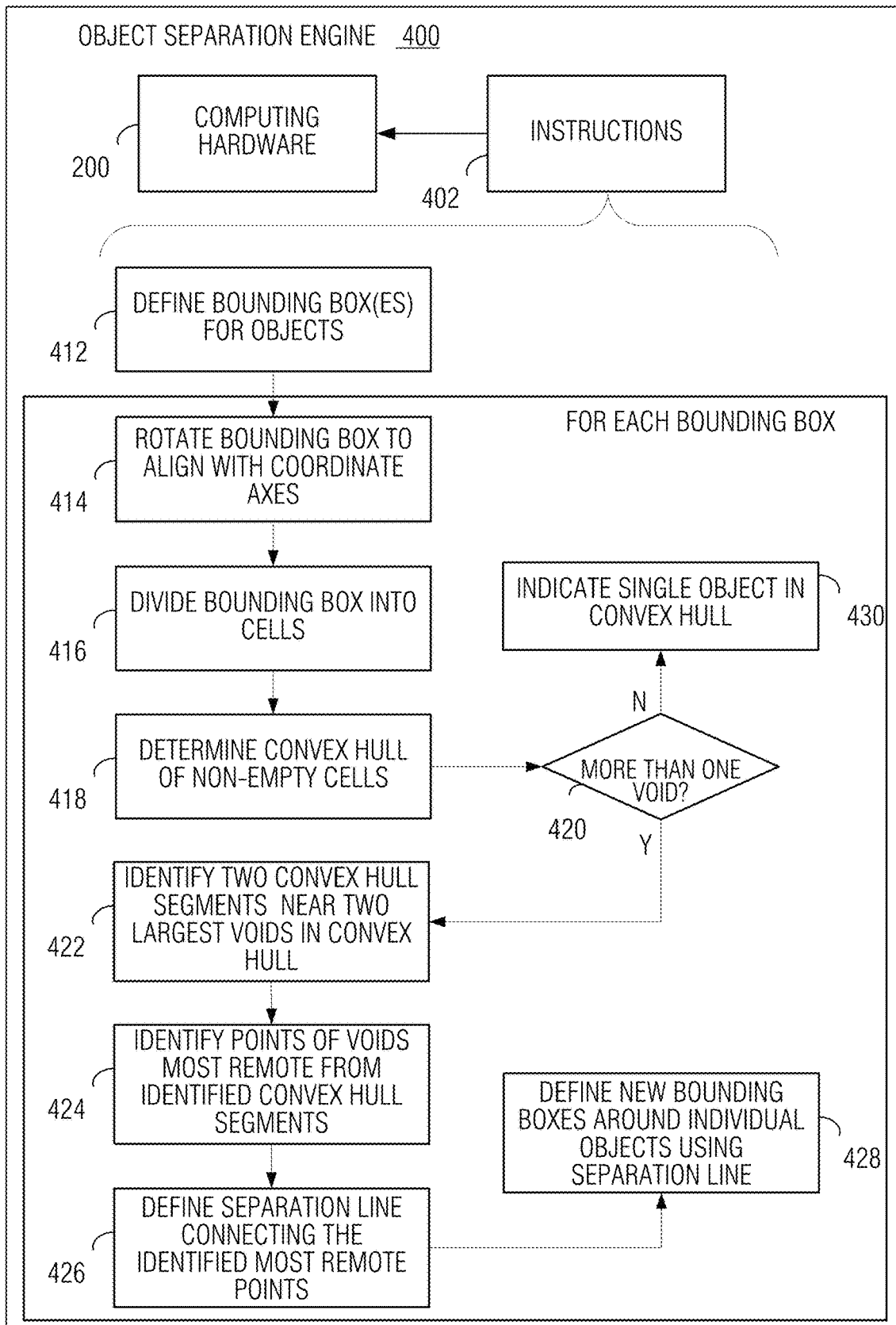
FIG. 4 is a structural diagram illustrating an object separation engine, which is one example of the object separation engine according to the example implementation of FIG. 3.

FIG. 4 is a structural diagram illustrating object separation engine 400, which is an example of object separation engine 154 according to an implementation. FIGS. 5A-5F illustrate various stages of processing of a captured image by object separation engine 400.

As depicted, object separation engine 400 includes computing hardware 200, and instructions 402 stored on one or more non-transitory storage media and executable by computing hardware 200 to implement object separation engine 400 according to this example. Instructions 402, when executed, cause the computing hardware 200 to implement the following process, which may be performed with different orderings of operations unless certain operations are specifically called out as being performed in sequence. In some variations, certain operations may be modified or omitted.

Notably, object separation engine 400 implements a simplified technique that is effective for separating two adjacent or overlapping objects. A more comprehensive technique is described below with reference to FIGS. 6-8 that is more generally applicable to images with more than one pair of adjacent or overlapping objects requiring discrimination.

Figure 5A:
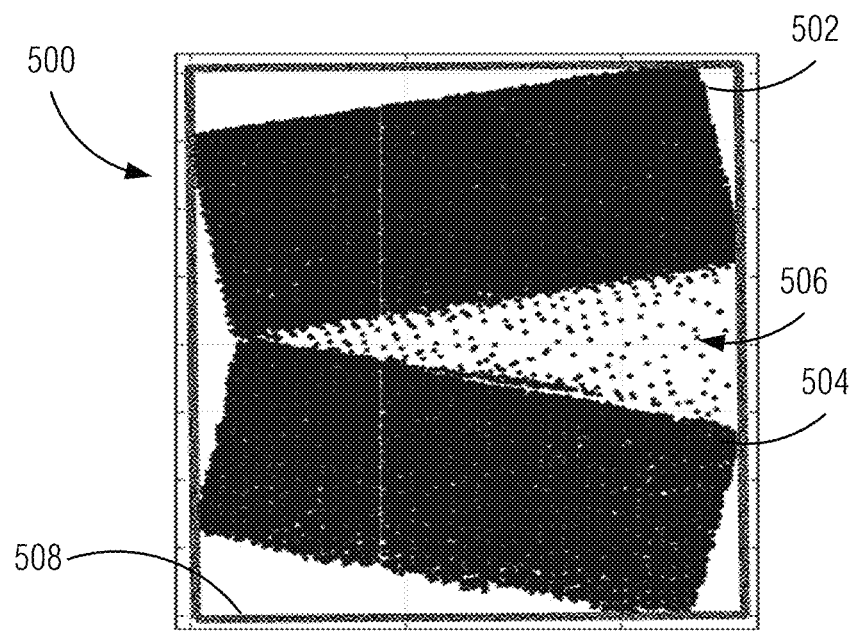
FIGS. 5A-5F illustrate various stages of processing of a captured image by the object separation engine of FIG. 4 according to an example.

FIG. 5A shows an example of image 500, which is an example of captured image 153, in which a pair of objects, 502 and 504, are touching at their corners. Image 500 also includes some noise as generally indicated at 506. Referring again to FIG. 4, at 412, object separation process flow engine 320 calls bounding box engine 302 to define a common bounding box for adjacent or overlapping objects. The bounding box in the illustrated example of FIGS. 5A-5F is indicated at 508 in FIG. 5A.

There may be more than one pair of adjacent or overlapping objects, and each pair would be enclosed by a respective bounding box. For each such bounding box, operations 414-430 are carried out as follows.

Figure 5B:
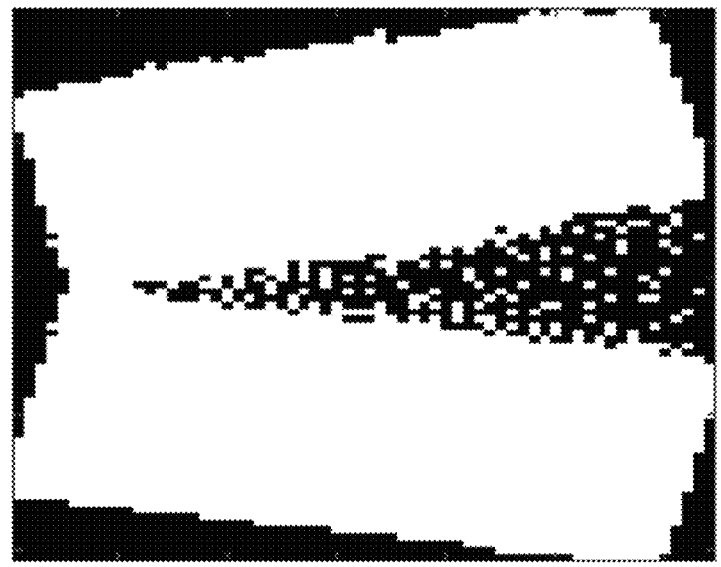

At 414, object separation process flow engine 320 calls image conversion/rotation engine 306, which operates to rotate the bounding box 508 into alignment with the coordinate axes. At 416 conversion/rotation engine 306 downsamples the contents of bounding box 508 (equivalently, divides the contents of bounding box 508 into cells). In the present context, the terms cells and downsampled pixels may be used interchangeably. The downsampled resolution or cell size may be sized so that each cell represents a large plurality of pixels (or points of a point cloud representation) of image 500, but also preserves the edges of objects 502 and 504. FIG. 5B illustrates a downsampled image of the interior of bounding box 508, where objects (non-empty cells) are shown in white, and empty cells are shown in black.

Figure 5C:
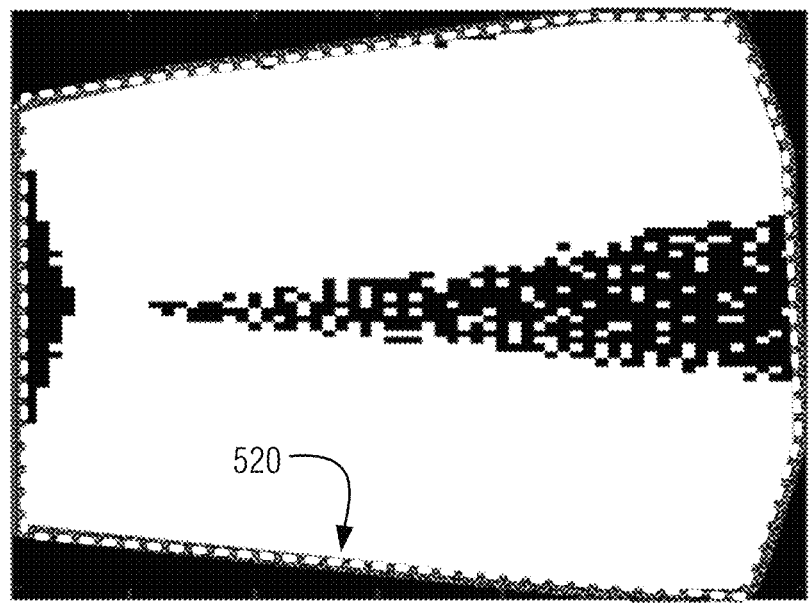
Figure 5D:
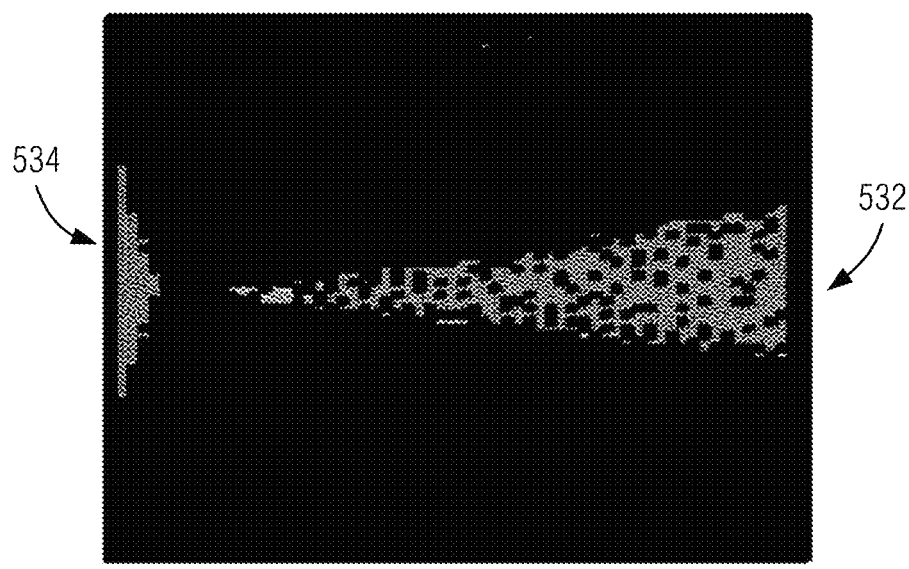
Figure 5E:
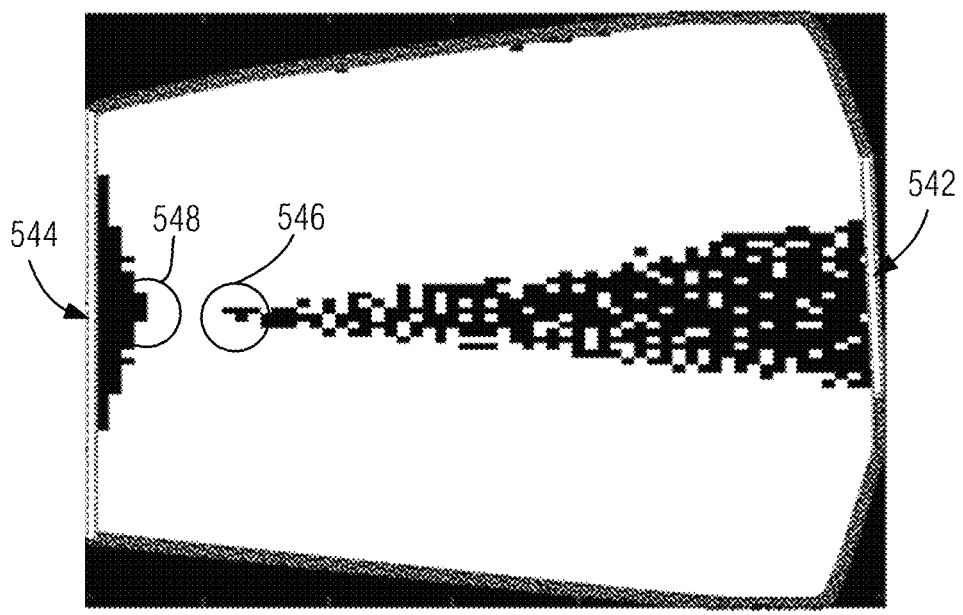

At 418, convex hull engine 304 is called by process flow engine 320 to define a convex hull around the non-empty cells. This is illustrated in FIG. 5C, with the convex hull indicated at 520 and shown as a white dashed line. The convex hull 520 encloses non-empty cells representing the object(s), but the convex hull 520 may also enclose clusters of empty cells, referred to herein as voids. At 420, void finding engine 308 is called to determine whether there is more than one void within convex hull 520. In the negative case, where there is one or zero voids in the convex hull 520, it means that there is only one object within convex hull 520. Accordingly, at 430 the process indicates this result. Otherwise, in the positive case, where there is more than one void within convex hull 520, void analysis engine 310 is called to identify the two largest voids within convex hull 520, as illustrated in FIG. 5D and indicated at 532 and 534. Furthermore, for each of voids 532 and 534, void analysis engine 310 identifies the segment of convex hull 520 that is nearest that void. These convex hull segments are shown in FIG. 5E and indicated respectively at 542 and 544.

Figure 5F:
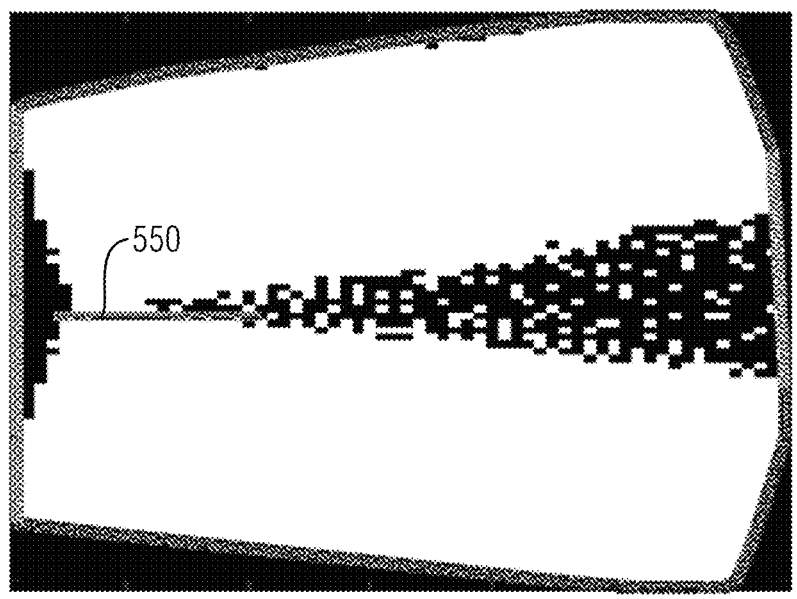

At 424, void analysis engine 310 is called to identify the point of each void which is the most remote point from the segment 542, 544 of convex hull 520. Examples of such points are indicated at 546 and 548, respectively. At 426, separation boundary engine 312 defines a separation line connecting points 546 and 548. In the example depicted, separation line 550 is shown in FIG. 5F. Separation line 550 divides the adjacent or overlapping objects in a practical way that enables the objects to be further analyzed using image processing techniques. Accordingly, at 428, bounding box engine 302 may be called to define new bounding boxes around each of the objects using a portion of the separation line 550 as a bounding box boundary for each. Noise reduction, dimensioning, or other operations may be performed separately for each object in its respective bounding box.

Figure 6:
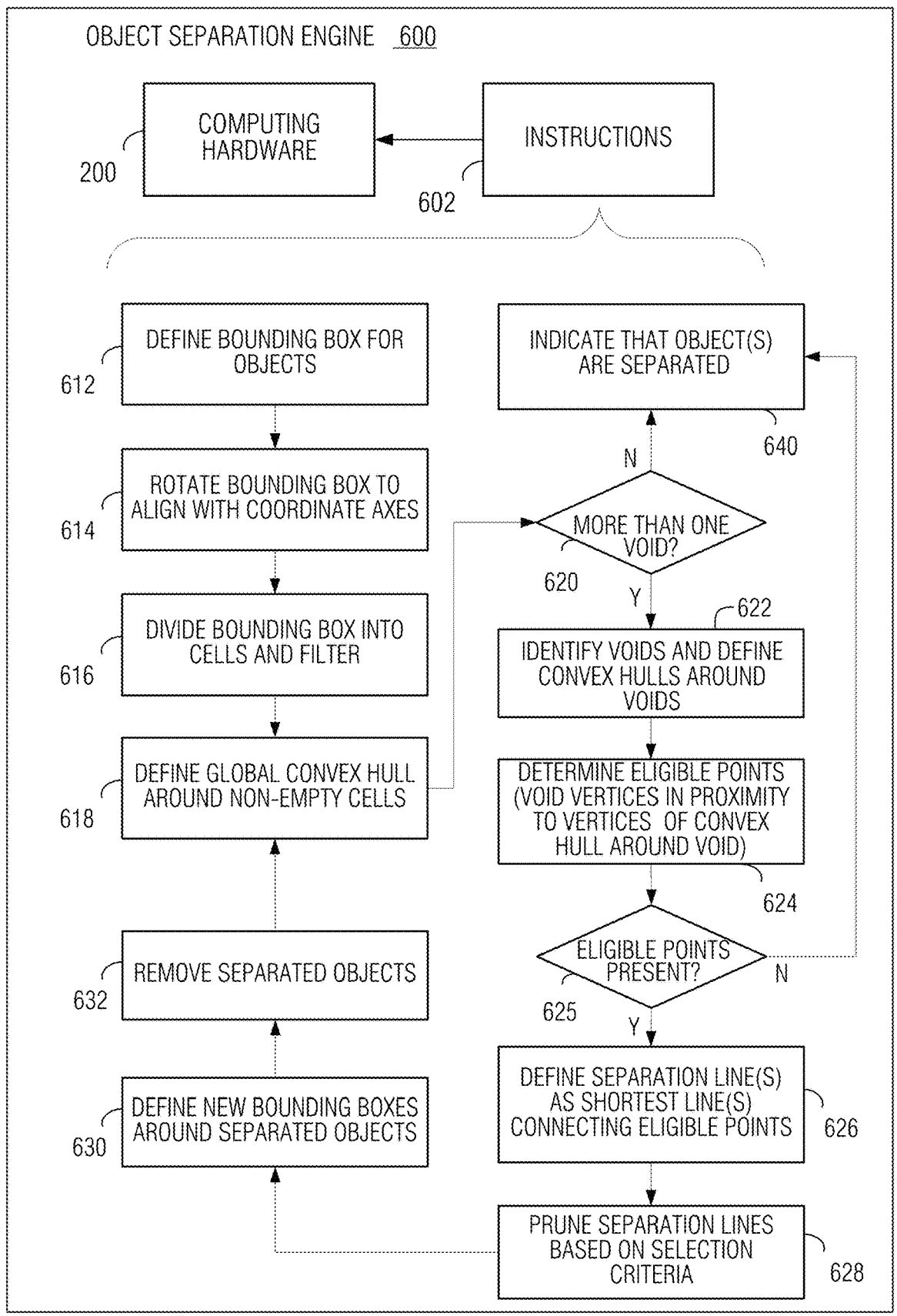
FIG. 6 is a structural diagram illustrating an object separation engine which is another example of the object separation engine of FIG. 3 according to an implementation.

FIG. 6 is a structural diagram illustrating object separation engine 600, which is another example of object separation engine 154 according to an implementation. FIGS. 7A-E and 8A-8E illustrate various stages of processing of two different examples of captured images by object separation engine 600.

As depicted, object separation engine 600 includes computing hardware 200, and instructions 602 stored on one or more non-transitory storage media and executable by computing hardware 200 to implement object separation engine 600 according to this example. Instructions 602, when executed, cause the computing hardware 200 to implement the following process, which may be performed with different orderings of operations unless certain operations are specifically called out as being performed in sequence. In some variations, certain operations may be modified or omitted.

Notably, object separation engine 600 implements a more robust technique than the previous example discussed above with reference to FIGS. 4-5. Object separation engine 600 is effective for discriminating more than two adjacent or overlapping objects, although it may require greater computational resources.

Figure 7A:
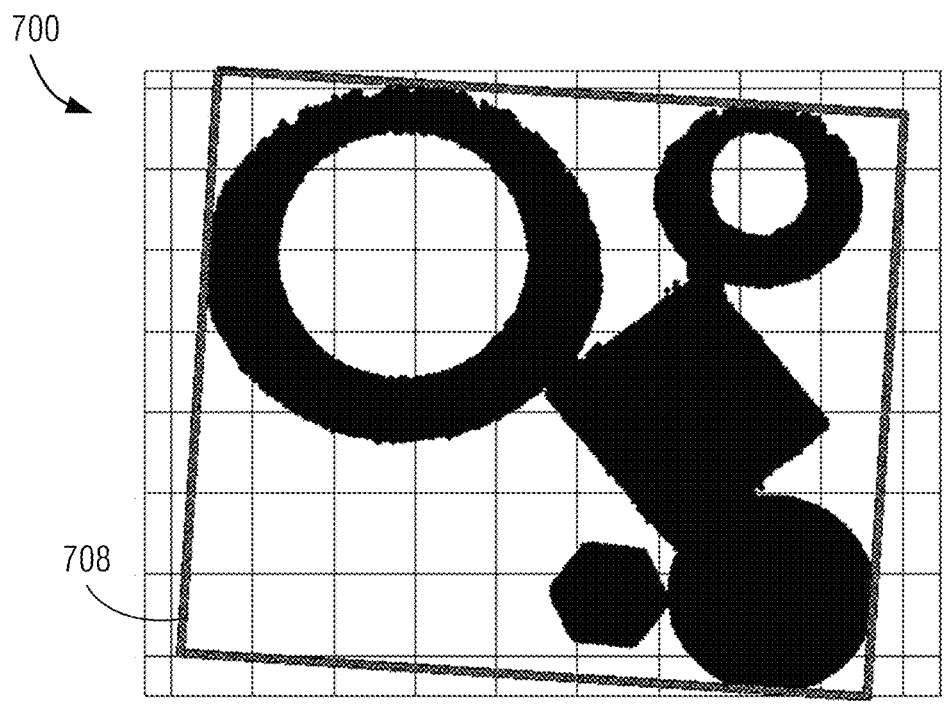
FIGS. 7A-E and 8A-8E illustrate various stages of processing of two different examples of captured images by the object separation engine of FIG. 6.

FIG. 7A shows an example of image 700, which is an example of captured image 153, in which 5 objects are adjacent or overlapping. Referring to FIG. 6, at 612, object separation process flow engine 320 calls bounding box engine 302 to define a common bounding box for the set of adjacent or overlapping objects. The bounding box is illustrated in FIG. 7A at 708.

Figure 7B:
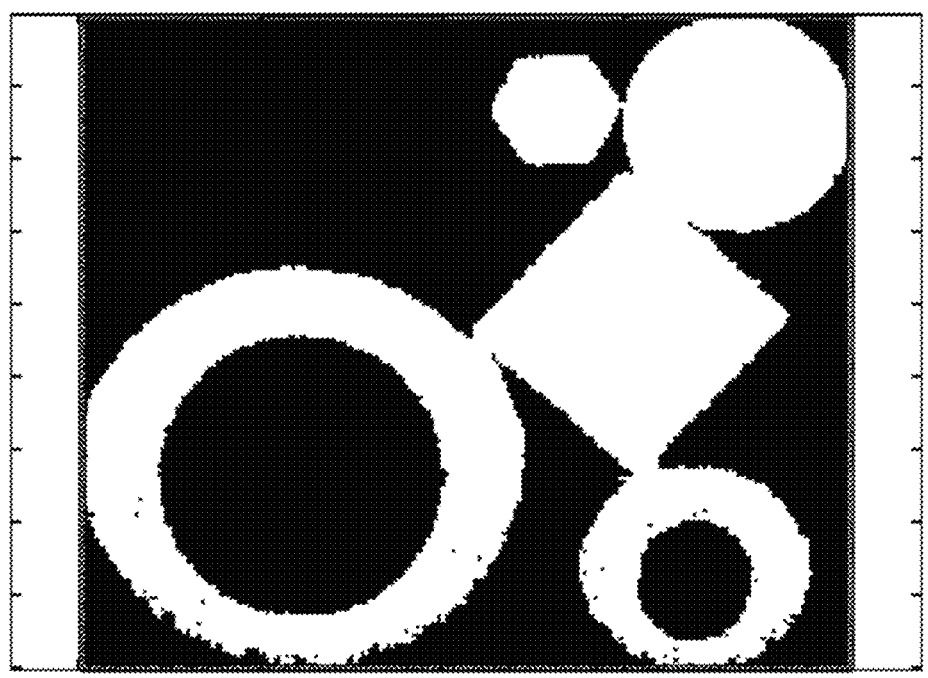

At 614, object separation process flow engine 320 calls image conversion/rotation engine 306 to rotate the bounding box 708 into alignment with the coordinate axes. At 616 conversion/rotation engine 306 downsamples the bounding box 708, i.e., divides it into cells. As in the previous example, the downsampled resolution or cell size may be sized so that each cell represents a large plurality of pixels (or points of a point cloud representation) of image 700, but also preserves the edges of the objects. FIG. 7B illustrates a rotated and downsampled image of the interior of bounding box 708, where objects (non-empty cells) are shown in white, and empty cells are shown in black.

Figure 7C:
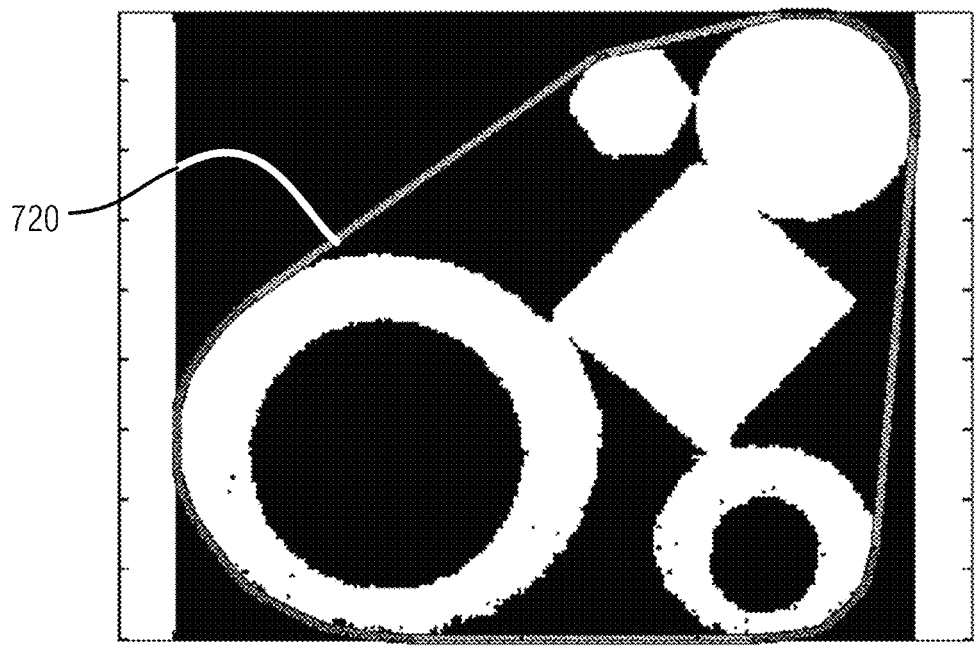

At 618, convex hull engine 304 is called by object separation process flow engine 320 to define a global convex hull around the non-empty cells. This is illustrated in FIG. 7C, with the global convex hull indicated at 720 and shown as a gray line. The convex hull 720 encloses non-empty cells representing the set of objects, as well as the voids. At 620, void finding engine 308 is called to determine whether there is more than one void within convex hull 720. In the negative case, where there is one or zero voids in the convex hull 720, it means that there is only one object within convex hull 720, or that multiple objects within the convex hull are separated (i.e., not adjacent and not overlapping). Accordingly, at 640 the process indicates this result.

Figure 7D:
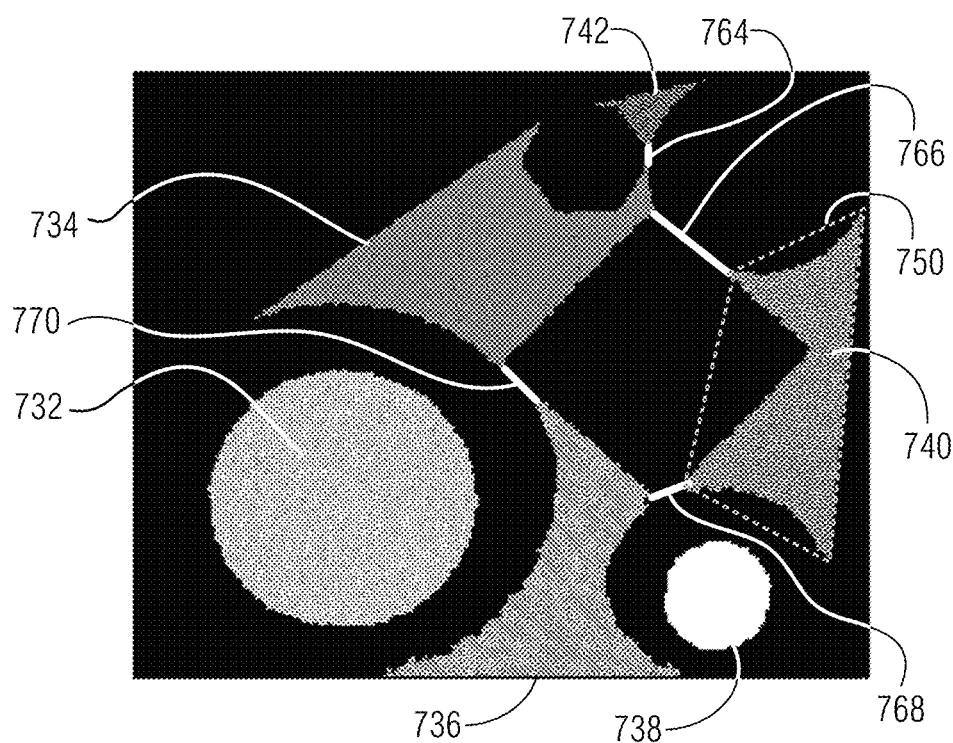

Otherwise, in the positive case, where there is more than one void within convex hull 720, object separation process flow engine 320 calls void finding engine 308 to identify the voids within convex hull 720. FIG. 7D illustrates identified voids 732, 734, 736, 738, 740, and 742. In a related implementation, void analysis engine 310 is called to apply predefined size threshold criteria in order to discard voids that are less than a predefined size (which may be defined by a major dimension, void area, e.g., based on a number of cells constituting the void, or the like) from further analysis. In addition, at 622, object separation process flow engine 320 calls convex hull engine 304 to define a convex hull, individually, around each one of the voids 732, 734, 736, 738, 740, and 742. In FIG. 7D, convex hull 750 corresponding to void 740 is shown with a dashed gray line (the other void-specific convex hulls around the other voids are omitted from FIG. 7D for the sake of clarity).

At 624, object separation process flow engine 320 calls void analysis engine 310 to find eligible points which may be determined to be endpoints of separation line segments, subject to further criteria. According to some embodiments, eligible points are those points along the perimeter of each void which are at sharp convex vertices. Sharp convex vertices may be determined based on computed angles between void perimeter segments. As an example, a set of eligible points is determined by compiling a list of void vertices which are within a defined proximity to vertices of the convex hull defined around its corresponding void. For instance, the defined proximity may be expressed in terms of cells (e.g., 10 cells). Advantageously, selection of void vertices in proximity to vertices of the convex hull avoids selecting points along the void perimeter (which may be jagged) that are not actual vertices. In a another example, the eligible points are selected based on computed angles of vertices of successive convex hull segments of the convex hull surrounding the void.

In a related embodiment, the angle and predominant orientation vector of the void region near the convex hull vertex, together with the distance from any global convex hull segment adjacent to the void, are additionally used to define the set of eligible points. In this example, the predominant orientation vector of the void region near the convex hull vertex (i.e., the convex hull surrounding the void) refers to the angle to which the vertex is pointing. For instance, void vertices that are pointing away from the nearest segment of the global convex hull may be preferentially selected as eligible points by void analysis engine 310.

Decision 625 checks whether the determination at 624 produced eligible points. In the affirmative case, the process advances to 626. Otherwise, the process branches to 640 to be concluded.

At 626, separation boundary engine 312 is called by object separation process flow engine 320 to process the set of eligible points to determine the endpoints of separation lines. The separation lines are defined as the shortest lines connecting eligible points between each pair of voids, and which lines are at least generally aligned with the predominant direction of the void pair's vertex regions. In other words, potential separation lines which are not aligned with the direction to which either void's vertex region is pointing, are to be excluded. Accordingly, at 628, separation boundary engine 312 is called to prune, or filter, the set of separation lines in accordance with selection criteria. Such selection criteria may take into account angle values, predominant orientation vectors, and distances from global convex hull segments. Advantageously, application of the selection criteria at 628 serves to exclude false separation lines, such as those connecting spurious voids formed by noise or shadowing of objects by other objects, as well as by self-shadowing of portions of the objects by other parts of the same objects. In some implementations, the selection criteria may be based on user-definable parameters, or it may be variable according to optimization or machine-learning algorithms.

Figure 7E:
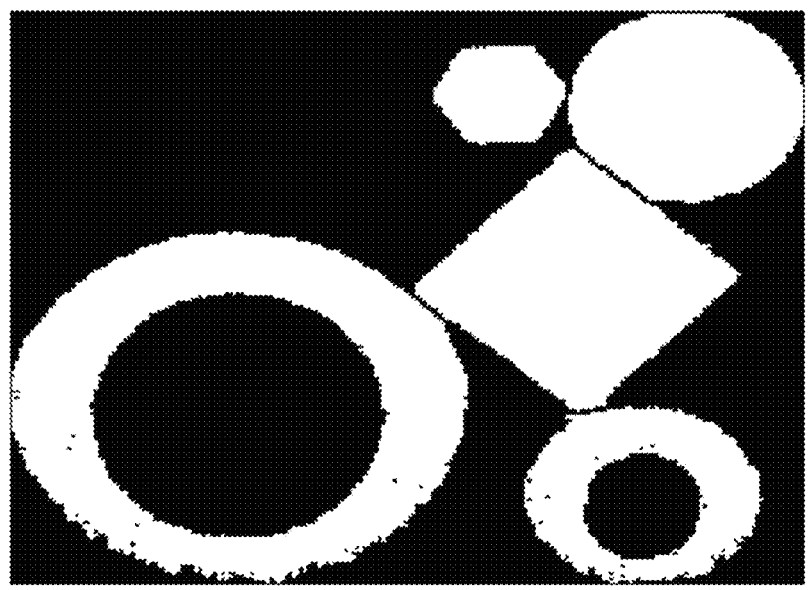

FIG. 7D illustrates separation lines 764, 766, 768, and 770 according to this selection criteria. These separation lines divide the adjacent or overlapping objects in a practical way that enables the objects to be further analyzed using image processing techniques. Accordingly, at 630, bounding box engine 302 may be called to define new bounding boxes around each of the objects using the respective separation lines as bounding box boundaries for each. Noise reduction, dimensioning, or other operations may be performed separately for each object in its respective bounding box. FIG. 7E illustrates the separated objects, each of which is individually identifiable. As illustrated, image 700 may be augmented by inserting empty cells along the separation lines so that there is only one contiguous void between the objects. There may exist one or more additional voids, which are fully bound within the periphery of one or more objects; however, these voids do not represent object overlap or adjacency and, as will be understood from the separation process described further, the presence of such interior voids will not disrupt the separation process.

The process carried out by object separation engine 600 which has been described thus far is effective for many situations where at most a single separation line defined between each pair of proximate voids is sufficient to discriminate the objects in the image. However, there may be other situations where multiple separation lines between a given pair of voids may be needed. FIGS. 8A-8E illustrate one such scenario as an example.

Figure 8A:
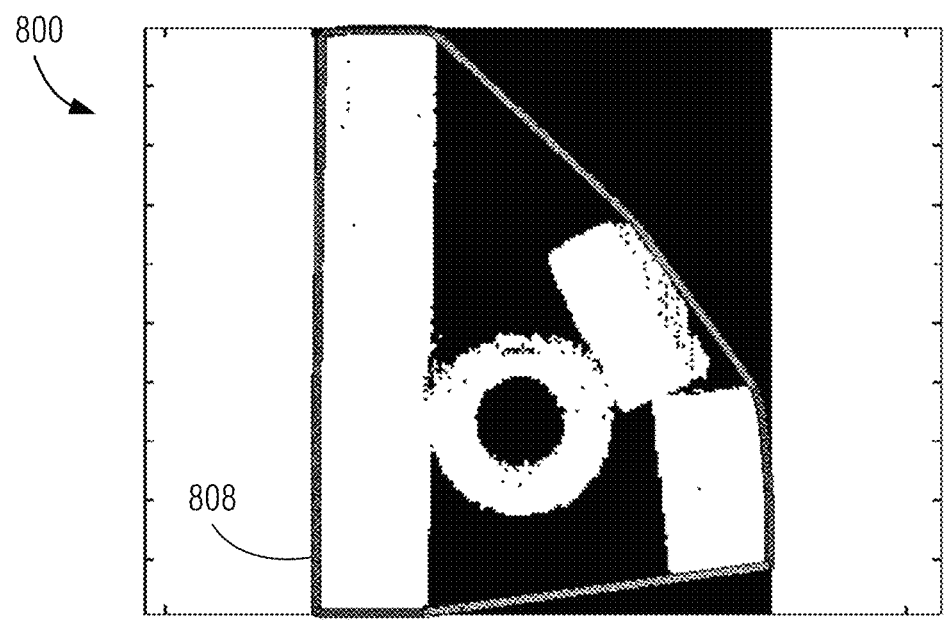
Figure 8B:
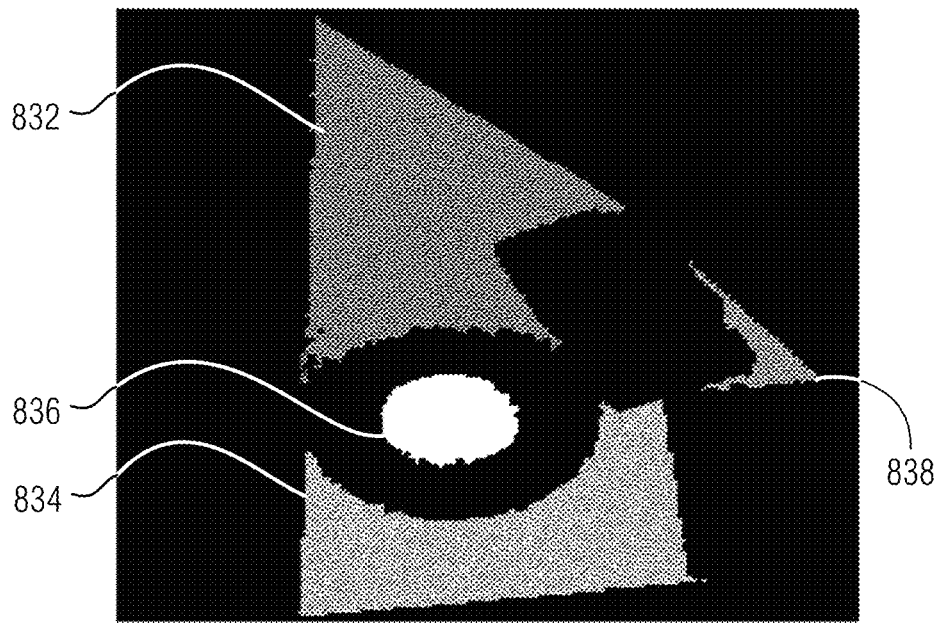
Figure 8C:
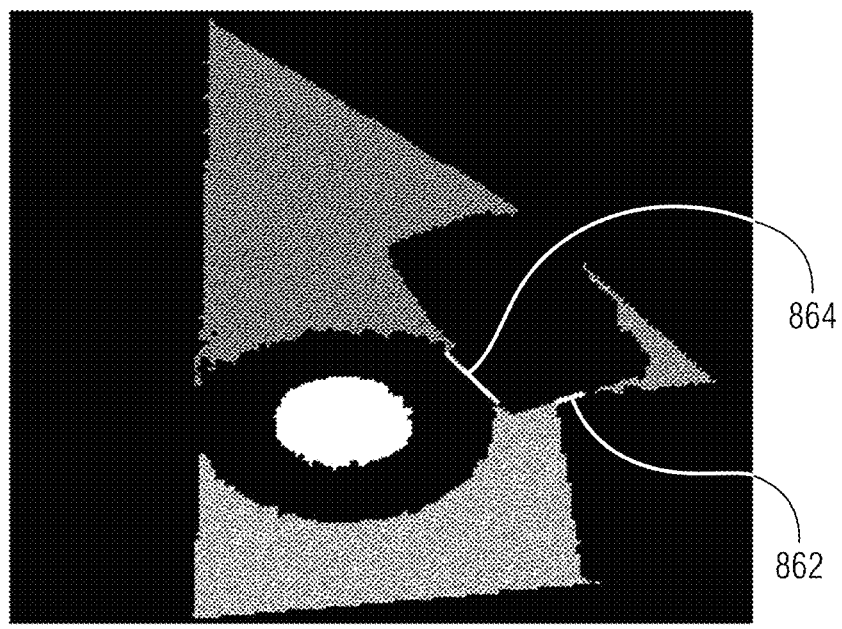

FIG. 8A illustrates image 800 representing four objects, each of which is touching an adjacent object. Convex hull 808 is defined by object separation engine 600 at operation 618. FIG. 8B illustrates identified voids 832, 834, 836, and 838. Further execution of the process carried out by object separation engine 600 through operation 628 produces separation lines 862 and 864, which separate the two small rectangular objects on the right side of the image from one another, and from the toroidal-shaped object.

Figure 8D:
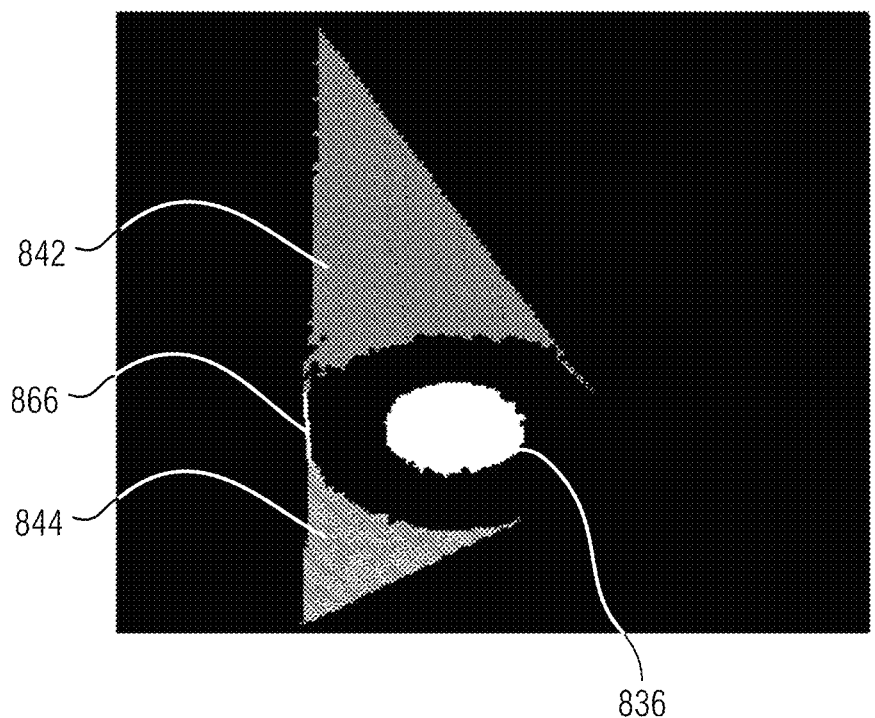

However, since a second separating line is needed between void 832 and void 834 along the left edge of the toroidal object, additional recursive operations are carried out. In particular, at 632, the objects which have been separated by the separation lines are removed from the image by calling image conversion/rotation engine 306. Removal of these objects may involve filling each of these objects' bounding box with blank cells. The result of this operation is illustrated in FIG. 8D. The process then loops back to 618, The result of this operation is illustrated in FIG. 8D, which shows void 836 as previously, but instead of the other previously-identified voids, now shows new voids 842 and 844. Repeating operations 622-628 on this updated image produces separation line 866, which effectively separates the toroidal object from the large rectangular object on the left of the image. The process may continue recursively until either there is not more than one void remaining as per decision 620, or no further eligible points are found as per decision 625 (as would be the case with the presence of interior void 836 in addition to the remaining void).

Figure 8E:
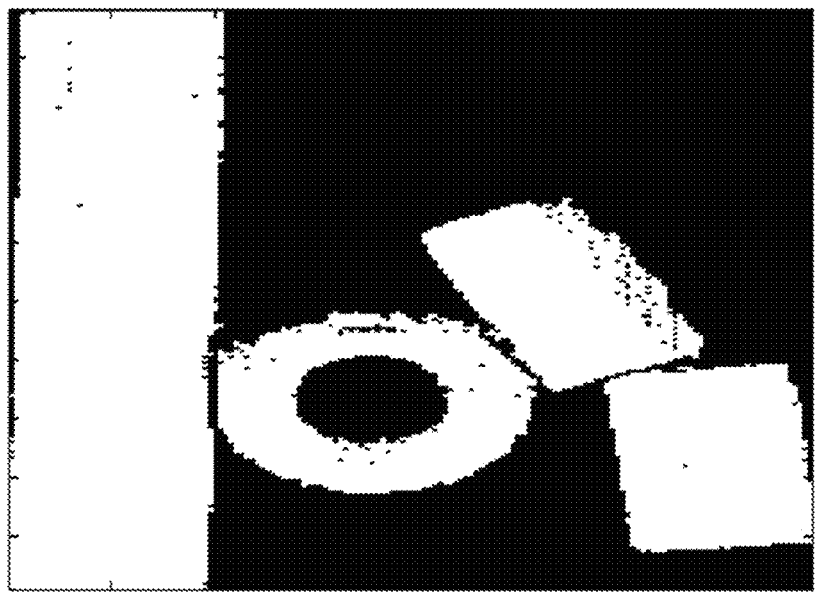

Thereafter, image 800 (with all objects present) may be augmented based on the defined separation lines to add empty cells between the objects to produce the result as shown in FIG. 8E.

Additional Notes and Examples

Example 1 is an image processing system for discriminating imaged objects that are adjacent or overlapping, the system comprising: an input to receive a captured image representing the objects; and an object separation engine operatively coupled to the input to perform autonomous processing of the captured image, wherein the autonomous processing includes: determination of non-empty cells of the image that contain portions of the objects, and empty cells of the image that lack any portions of the objects; determination of a global convex hull surrounding the non-empty cells of the image; determination of voids, including at least a first void and a second void, within the global convex hull, each of the voids being composed of contiguous empty cells of the image and having a corresponding void boundary; determination of a separation line based on a first separation line endpoint along the void boundary of the first void and a second separation line endpoint along the void boundary of the second void, wherein the separation line separates two of the objects in the image; and wherein the autonomous processing produces an output that includes indicia of at least portions of distinct boundaries of the objects in the image based on the separation line.

In Example 2, the subject matter of Example 1 includes, wherein determination of the separation line includes: identification of a first segment of the global convex hull nearest the first void and a second segment of the global convex hull nearest the second void, wherein the first void and the second void are the largest of the voids within the global convex hull; determination of the first separation line segment endpoint and the second separation line segment endpoint as points in the first void and the second void, respectively, that are at a greatest distance from the first segment of the global convex hull and the second segment of the global convex hull, respectively.

In Example 3, the subject matter of Examples 1-2 includes, wherein the autonomous processing further includes: definition of an object-specific bounding box around each of the objects based on the indicia of the at least portions of distinct boundaries of the objects in the image.

In Example 4, the subject matter of Examples 1-3 includes, wherein the autonomous processing further includes: downsampling of at least a portion of the captured image to produce a predefined resolution of at least that portion prior to the determination of non-empty cells of the image that contain portions of the objects.

In Example 5, the subject matter of Examples 1-4 includes, wherein the autonomous processing further includes: prior to determination of the global convex hull, definition of a bounding box circumscribing the non-empty cells of the image.

In Example 6, the subject matter of Examples 1-5 includes, wherein the autonomous processing further includes: following the determination of the voids, definition of a convex hull around each of the voids; and wherein determination of the separation line includes: definition of a set of eligible points as potential separation line endpoints, wherein the set of eligible points include, for each of the voids, vertices of the boundaries of that void, the vertices being in proximity to vertices of the convex hull corresponding to that void based on proximity criteria; and definition of the separation line as a shortest line connecting the eligible points of the first void and the second void.

In Example 7, the subject matter of Example 6 includes, wherein the vertices of the boundaries of each void that are the eligible points are determined as points along the perimeter of that void which are at sharp convex vertices.

In Example 8, the subject matter of Examples 6-7 includes, wherein the eligible points are determined for each void based on computation of angle and predominant orientation vector of a void region of that void near the convex hull vertex.

In Example 9, the subject matter of Example 8 includes, wherein the eligible points are further determined for each void based on a computed distance from any global convex hull segment adjacent to that void.

In Example 10, the subject matter of Examples 6-9 includes, definition of set of a plurality of separation lines based on the set of eligible points, wherein each of the plurality of separation lines separates a different pair of the objects in the image.

In Example 11, the subject matter of Examples 1-10 includes, wherein the autonomous processing further determines at least one additional separation line based on at least a third separation line endpoint along the void boundary of the first void and at least a fourth separation line endpoint along the void boundary of the second void.

In Example 12, the subject matter of Examples 1-11 includes, wherein the determination of voids includes determination of least a third void within the global convex hull; and wherein the autonomous processing further determines at least one additional separation line based on at least a third separation line endpoint along the void boundary of the first void and at least a fourth separation line endpoint along the void boundary of the third void.

In Example 13, the subject matter of Examples 1-12 includes, wherein the autonomous processing further comprises: performing the following operations recursively: augmentation of the image to remove a separated object from the image to produce a revised image; determination of a new global convex hull surrounding the non-empty cells of the revised image; determination of voids, including at least a third void and a fourth void, within the new global convex hull, each of the voids being composed of contiguous empty cells of the revised image and having a corresponding void boundary; and determination of a new separation line based on a third separation line endpoint along the void boundary of the third void and a fourth separation line endpoint along the void boundary of the fourth void, wherein the new separation line separates two of the objects in the revised image.

In Example 14, the subject matter of Examples 1-13 includes, computing hardware, including processor circuitry, memory circuitry including a non-transitory storage medium readable by the processor circuitry, and input/output circuitry operatively coupled with the processor circuitry; and wherein the memory circuitry includes instructions that, when executed by the processor circuitry, implement the object separation engine.

In Example 15, the subject matter of Examples 1-14 includes, an object assessment engine having an input operatively coupled to the output of the object separation engine, the object assessment engine being operative to receive as its input the output of the autonomous processing, and to autonomously produce respective assessments of properties of the objects in the image based on the output of the autonomous processing.

In Example 16, the subject matter of Examples 1-15 includes, an image capture engine operatively coupled to an image capture device, the image capture engine operative to receive, as its input, an output of the capture device, and to produce, as its output, the captured image.

Example 17 is an automated method for processing an image to discriminate imaged objects that are adjacent or overlapping, the method comprising: receiving a captured image representing the objects; determining non-empty cells of the image that contain portions of the objects, and empty cells of the image that lack any portions of the objects; determining a global convex hull surrounding the non-empty cells of the image; determining voids, including at least a first void and a second void, within the global convex hull, each of the voids being composed of contiguous empty cells of the image and having a corresponding void boundary; defining a separation line based on a first separation line endpoint along the void boundary of the first void and a second separation line endpoint along the void boundary of the second void, wherein the separation line separates two of the objects in the image; and producing an output that includes indicia of at least portions of distinct boundaries of the objects in the image based on the separation line.

In Example 18, the subject matter of Example 17 includes, wherein the determining of the separation line includes: identifying a first segment of the global convex hull nearest the first void and a second segment of the global convex hull nearest the second void, wherein the first void and the second void are the largest of the voids within the global convex hull; and determining the first separation line segment endpoint and the second separation line segment endpoint as points in the first void and the second void, respectively, that are at a greatest distance from the first segment of the global convex hull and the second segment of the global convex hull, respectively.

In Example 19, the subject matter of Examples 17-18 includes, defining an object-specific bounding box around each of the objects based on the indicia of the at least portions of distinct boundaries of the objects in the image.

In Example 20, the subject matter of Examples 17-19 includes, downsampling at least a portion of the captured image to produce a predefined resolution of at least that portion prior to the determination of non-empty cells of the image that contain portions of the objects.

In Example 21, the subject matter of Examples 17-20 includes, prior to determining the global convex hull, defining a bounding box circumscribing the non-empty cells of the image.

In Example 22, the subject matter of Examples 17-21 includes, after determining the voids, defining a convex hull around each of the voids; and wherein determining the separation line includes: defining a set of eligible points as potential separation line endpoints, wherein the set of eligible points include, for each of the voids, vertices of the boundaries of that void, the vertices being in proximity to vertices of the convex hull corresponding to that void based on proximity criteria; and defining the separation line as a shortest line connecting the eligible points of the first void and the second void.

In Example 23, the subject matter of Example 22 includes, wherein in defining the set of eligible points, the vertices of the boundaries of each void that are the eligible points are determined as points along the perimeter of that void which are at sharp convex vertices.

In Example 24, the subject matter of Examples 22-23 includes, wherein in defining the set of eligible points, the eligible points are determined for each void based on computation of angle and predominant orientation vector of a void region of that void near the convex hull vertex.

In Example 25, the subject matter of Example 24 includes, wherein in defining the set of eligible points, the eligible points are further determined for each void based on a computed distance from any global convex hull segment adjacent to that void.

In Example 26, the subject matter of Examples 22-25 includes, defining a set of a plurality of separation lines based on the set of eligible points, wherein each of the plurality of separation lines separates a different pair of the objects in the image.

In Example 27, the subject matter of Examples 17-26 includes, determining at least one additional separation line based on at least a third separation line endpoint along the void boundary of the first void and at least a fourth separation line endpoint along the void boundary of the second void.

In Example 28, the subject matter of Examples 17-27 includes, wherein the determining of voids includes determining least a third void within the global convex hull; and further comprising determining at least one additional separation line based on at least a third separation line endpoint along the void boundary of the first void and at least a fourth separation line endpoint along the void boundary of the third void.

In Example 29, the subject matter of Examples 17-28 includes, performing the following operations recursively: augmenting the image to remove a separated object from the image to produce a revised image; determining a new global convex hull surrounding the non-empty cells of the revised image; determining voids, including at least a third void and a fourth void, within the new global convex hull, each of the voids being composed of contiguous empty cells of the revised image and having a corresponding void boundary; and determining a new separation line based on a third separation line endpoint along the void boundary of the third void and a fourth separation line endpoint along the void boundary of the fourth void, wherein the new separation line separates two of the objects in the revised image.

Example 30 is at least one non-transitory machine-readable storage medium containing instructions that, when executed by computing hardware, cause the computing hardware to implement an automated operations for processing an image to discriminate imaged objects that are adjacent or overlapping, the operations comprising: receiving a captured image representing the objects; determining non-empty cells of the image that contain portions of the objects, and empty cells of the image that lack any portions of the objects; determining a global convex hull surrounding the non-empty cells of the image; determining voids, including at least a first void and a second void, within the global convex hull, each of the voids being composed of contiguous empty cells of the image and having a corresponding void boundary; defining a separation line based on a first separation line endpoint along the void boundary of the first void and a second separation line endpoint along the void boundary of the second void, wherein the separation line separates two of the objects in the image; and producing an output that includes indicia of at least portions of distinct boundaries of the objects in the image based on the separation line.

In Example 31, the subject matter of Example 30 includes, wherein in the operations, the determining of the separation line includes: identifying a first segment of the global convex hull nearest the first void and a second segment of the global convex hull nearest the second void, wherein the first void and the second void are the largest of the voids within the global convex hull; and determining the first separation line segment and the second separation line segment as points in the first void and the second void, respectively, that are at a greatest distance from the first segment of the global convex hull and the second segment of the global convex hull, respectively.

In Example 32, the subject matter of Examples 30-31 includes, instructions that, when executed, cause the computing hardware to perform operations including: defining an object-specific bounding box around each of the objects based on the indicia of the at least portions of distinct boundaries of the objects in the image.

In Example 33, the subject matter of Examples 30-32 includes, instructions that, when executed, cause the computing hardware to perform operations including: downsampling at least a portion of the captured image to produce a predefined resolution of at least that portion prior to the determination of non-empty cells of the image that contain portions of the objects.

In Example 34, the subject matter of Examples 30-33 includes, instructions that, when executed, cause the computing hardware to perform operations including: prior to determining the global convex hull, defining a bounding box circumscribing the non-empty cells of the image.

In Example 35, the subject matter of Examples 30-34 includes, instructions that, when executed, cause the computing hardware to perform operations including: after determining the voids, defining a convex hull around each of the voids; and wherein determining the separation line includes: defining a set of eligible points as potential separation line endpoints, wherein the set of eligible points include, for each of the voids, vertices of the boundaries of that void, the vertices being in proximity to vertices of the convex hull corresponding to that void based on proximity criteria; and defining the separation line as a shortest line connecting the eligible points of the first void and the second void.

In Example 36, the subject matter of Example 35 includes, wherein in the operations of defining the set of eligible points, the vertices of the boundaries of each void that are the eligible points are determined as points along the perimeter of that void which are at sharp convex vertices.

In Example 37, the subject matter of Examples 35-36 includes, wherein in the operations of defining the set of eligible points, the eligible points are determined for each void based on computation of angle and predominant orientation vector of a void region of that void near the convex hull vertex.

In Example 38, the subject matter of Example 37 includes, wherein in the operations of defining the set of eligible points, the eligible points are further determined for each void based on a computed distance from any global convex hull segment adjacent to that void.

In Example 39, the subject matter of Examples 35-38 includes, instructions that, when executed, cause the computing hardware to perform operations including: defining a set of a plurality of separation lines based on the set of eligible points, wherein each of the plurality of separation lines separates a different pair of the objects in the image.

In Example 40, the subject matter of Examples 30-39 includes, instructions that, when executed, cause the computing hardware to perform operations including: determining at least one additional separation line based on at least a third separation line endpoint along the void boundary of the first void and at least a fourth separation line endpoint along the void boundary of the second void.

In Example 41, the subject matter of Examples 30-40 includes, wherein the operation of the determining of voids includes determining least a third void within the global convex hull; and further comprising instructions that, when executed, cause the computing hardware to perform operations including determining at least one additional separation line based on at least a third separation line endpoint along the void boundary of the first void and at least a fourth separation line endpoint along the void boundary of the third void.

In Example 42, the subject matter of Examples 30-41 includes, instructions that, when executed, cause the computing hardware to perform operations including: performing the following operations recursively: augmenting the image to remove a separated object from the image to produce a revised image; determining a new global convex hull surrounding the non-empty cells of the revised image; determining voids, including at least a third void and a fourth void, within the new global convex hull, each of the voids being composed of contiguous empty cells of the revised image and having a corresponding void boundary; and determining a new separation line based on a third separation line endpoint along the void boundary of the third void and a fourth separation line endpoint along the void boundary of the fourth void, wherein the new separation line separates two of the objects in the revised image.

Example 43 is an apparatus comprising means to implement of any of Examples 1-42.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An image processing system for discriminating imaged objects that are adjacent or overlapping, the system comprising:
    an input to receive a captured image representing the objects; and
    an object separation engine operatively coupled to the input to perform autonomous processing of the captured image, wherein the autonomous processing includes:
        determination of non-empty cells of the image that contain portions of the objects, and empty cells of the image that lack any portions of the objects;
        determination of a global convex hull surrounding the non-empty cells of the image;
        determination of voids, including at least a first void and a second void, within the global convex hull, each of the voids being composed of contiguous empty cells of the image and having a corresponding void boundary;
        determination of a separation line based on a first separation line endpoint along the void boundary of the first void and a second separation line endpoint along the void boundary of the second void, wherein the separation line separates two of the objects in the image; and
    wherein the autonomous processing produces an output that includes indicia of at least portions of distinct boundaries of the objects in the image based on the separation line.

2. The image processing system of claim 1, wherein determination of the separation line includes:
    identification of a first segment of the global convex hull nearest the first void and a second segment of the global convex hull nearest the second void, wherein the first void and the second void are the largest of the voids within the global convex hull;
    determination of the first separation line endpoint and the second separation line endpoint as points in the first void and the second void, respectively, that are at a greatest distance from the first segment of the global convex hull and the second segment of the global convex hull, respectively.

3. The image processing system of claim 1, wherein the autonomous processing further includes:
    following the determination of the voids, definition of a convex hull around each of the voids; and
    wherein determination of the separation line includes:
        definition of a set of eligible points as potential separation line endpoints, wherein the set of eligible points include, for each of the voids, vertices of the boundaries of that void, the vertices being in proximity to vertices of the convex hull corresponding to that void based on proximity criteria; and definition of the separation line as a shortest line connecting the eligible points of the first void and the second void.

4. The image processing system of claim 3, wherein the vertices of the boundaries of each void that are the eligible points are determined as points along the perimeter of that void which are at sharp convex vertices.

5. The image processing system of claim 3, wherein the eligible points are determined for each void based on computation of angle and predominant orientation vector of a void region of that void near the convex hull vertex.

6. The image processing system of claim 1, wherein the autonomous processing further determines at least one additional separation line based on at least a third separation line endpoint along the void boundary of the first void and at least a fourth separation line endpoint along the void boundary of the second void.

7. The image processing system of claim 1, wherein the determination of voids includes determination of least a third void within the global convex hull; and
wherein the autonomous processing further determines at least one additional separation line based on at least a third separation line endpoint along the void boundary of the first void and at least a fourth separation line endpoint along the void boundary of the third void.

8. The image processing system of claim 1, wherein the autonomous processing further comprises:
performing the following operations recursively:
augmentation of the image to remove a separated object from the image to produce a revised image;
determination of a new global convex hull surrounding the non-empty cells of the revised image;
determination of voids, including at least a third void and a fourth void, within the new global convex hull, each of the voids being composed of contiguous empty cells of the revised image and having a corresponding void boundary; and
determination of a new separation line based on a third separation line endpoint along the void boundary of the third void and a fourth separation line endpoint along the void boundary of the fourth void, wherein the new separation line separates two of the objects in the revised image.

9. An automated method for processing an image to discriminate imaged objects that are adjacent or overlapping, the method comprising:
receiving a captured image representing the objects;
determining non-empty cells of the image that contain portions of the objects, and empty cells of the image that lack any portions of the objects;
determining a global convex hull surrounding the non-empty cells of the image;
determining voids, including at least a first void and a second void, within the global convex hull, each of the voids being composed of contiguous empty cells of the image and having a corresponding void boundary;
defining a separation line based on a first separation line endpoint along the void boundary of the first void and a second separation line endpoint along the void boundary of the second void, wherein the separation line separates two of the objects in the image; and
producing an output that includes indicia of at least portions of distinct boundaries of the objects in the image based on the separation line.

10. The method of claim 9, further comprising:
after determining the voids, defining a convex hull around each of the voids; and
wherein determining the separation line includes:
defining a set of eligible points as potential separation line endpoints, wherein the set of eligible points include, for each of the voids, vertices of the boundaries of that void, the vertices being in proximity to vertices of the convex hull corresponding to that void based on proximity criteria; and
defining the separation line as a shortest line connecting the eligible points of the first void and the second void.

11. The method of claim 10, wherein in defining the set of eligible points, the eligible points are determined for each void based on computation of angle and predominant orientation vector of a void region of that void near the convex hull vertex.

12. The method of claim 10, further comprising:
defining a set of a plurality of separation lines based on the set of eligible points, wherein each of the plurality of separation lines separates a different pair of the objects in the image.

13. The method of claim 9, wherein the determining of voids includes determining least a third void within the global convex hull; and
further comprising determining at least one additional separation line based on at least a third separation line endpoint along the void boundary of the first void and at least a fourth separation line endpoint along the void boundary of the third void.

14. The method of claim 9, further comprising:
performing the following operations recursively:
augmenting the image to remove a separated object from the image to produce a revised image;
determining a new global convex hull surrounding the non-empty cells of the revised image;
determining voids, including at least a third void and a fourth void, within the new global convex hull, each of the voids being composed of contiguous empty cells of the revised image and having a corresponding void boundary; and
determining a new separation line based on a third separation line endpoint along the void boundary of the third void and a fourth separation line endpoint along the void boundary of the fourth void, wherein the new separation line separates two of the objects in the revised image.

15. At least one non-transitory machine-readable storage medium containing instructions that, when executed by computing hardware, cause the computing hardware to implement an automated operations for processing an image to discriminate imaged objects that are adjacent or overlapping, the operations comprising:
receiving a captured image representing the objects;
determining non-empty cells of the image that contain portions of the objects, and empty cells of the image that lack any portions of the objects;
determining a global convex hull surrounding the non-empty cells of the image;
determining voids, including at least a first void and a second void, within the global convex hull, each of the voids being composed of contiguous empty cells of the image and having a corresponding void boundary;
defining a separation line based on a first separation line endpoint along the void boundary of the first void and a second separation line endpoint along the void boundary of the second void, wherein the separation line separates two of the objects in the image; and producing an output that includes indicia of at least portions of distinct boundaries of the objects in the image based on the separation line.

16. The at least one non-transitory machine-readable storage medium of claim 15, further comprising instructions that, when executed, cause the computing hardware to perform operations including:
    after determining the voids, defining a convex hull around each of the voids; and
    wherein determining the separation line includes:
        defining a set of eligible points as potential separation line endpoints, wherein the set of eligible points include, for each of the voids, vertices of the boundaries of that void, the vertices being in proximity to vertices of the convex hull corresponding to that void based on proximity criteria; and
        defining the separation line as a shortest line connecting the eligible points of the first void and the second void.

17. The at least one non-transitory machine-readable storage medium of claim 16, further comprising instructions that, when executed, cause the computing hardware to perform operations including:
    defining a set of a plurality of separation lines based on the set of eligible points, wherein each of the plurality of separation lines separates a different pair of the objects in the image.

18. The at least one non-transitory machine-readable storage medium of claim 15, further comprising instructions that, when executed, cause the computing hardware to perform operations including: determining at least one additional separation line based on at least a third separation line endpoint along the void boundary of the first void and at least a fourth separation line endpoint along the void boundary of the second void.

19. The at least one non-transitory machine-readable storage medium of claim 15, wherein the operation of the determining of voids includes determining least a third void within the global convex hull; and
    further comprising instructions that, when executed, cause the computing hardware to perform operations including determining at least one additional separation line based on at least a third separation line endpoint along the void boundary of the first void and at least a fourth separation line endpoint along the void boundary of the third void.

20. The at least one non-transitory machine-readable storage medium of claim 15, further comprising instructions that, when executed, cause the computing hardware to perform operations including:
    performing the following operations recursively:
        augmenting the image to remove a separated object from the image to produce a revised image;
        determining a new global convex hull surrounding the non-empty cells of the revised image;
        determining voids, including at least a third void and a fourth void, within the new global convex hull, each of the voids being composed of contiguous empty cells of the revised image and having a corresponding void boundary; and
        determining a new separation line based on a third separation line endpoint along the void boundary of the third void and a fourth separation line endpoint along the void boundary of the fourth void, wherein the new separation line separates two of the objects in the revised image.

* * * * *